Patented Feb. 4, 1941

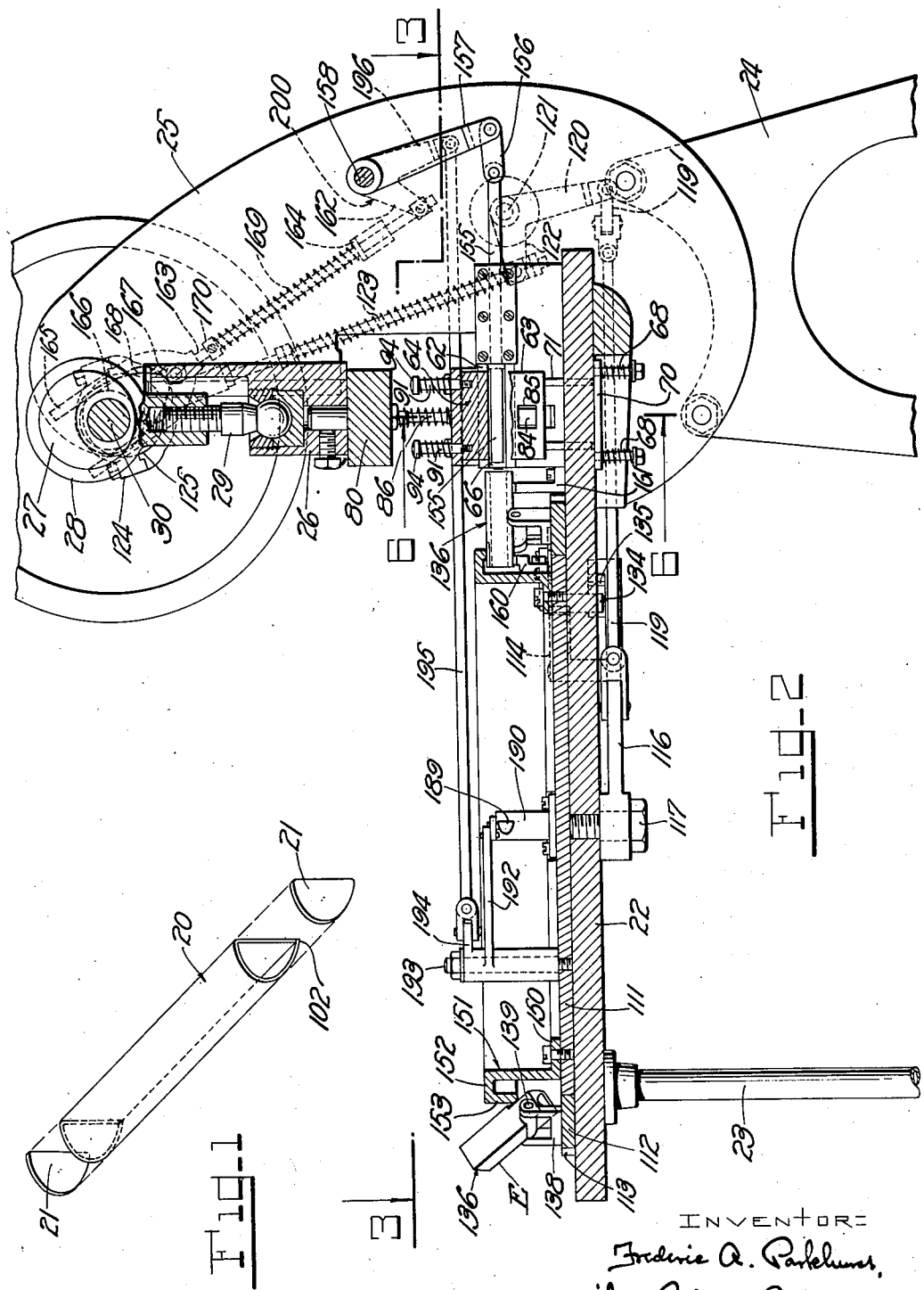

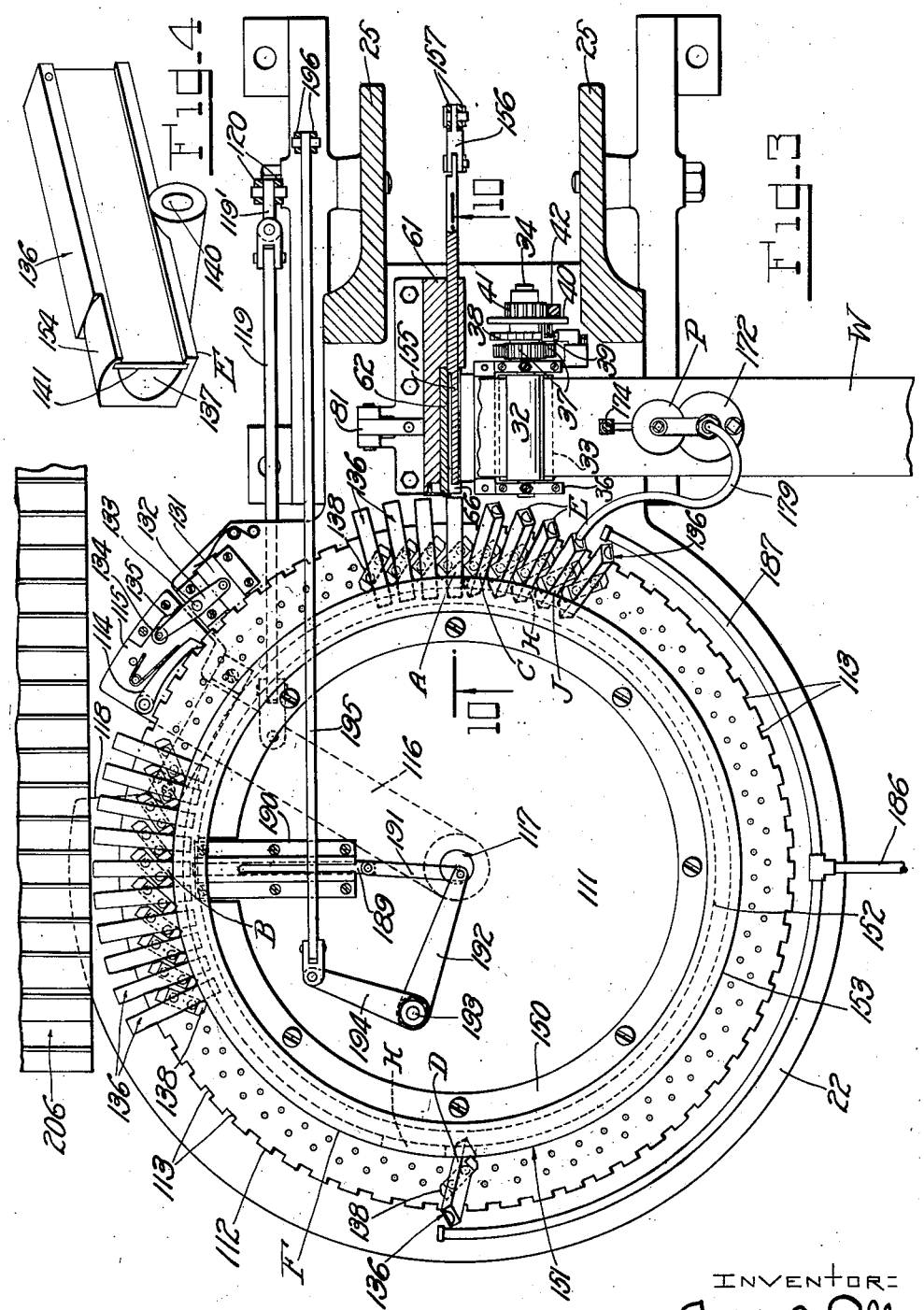

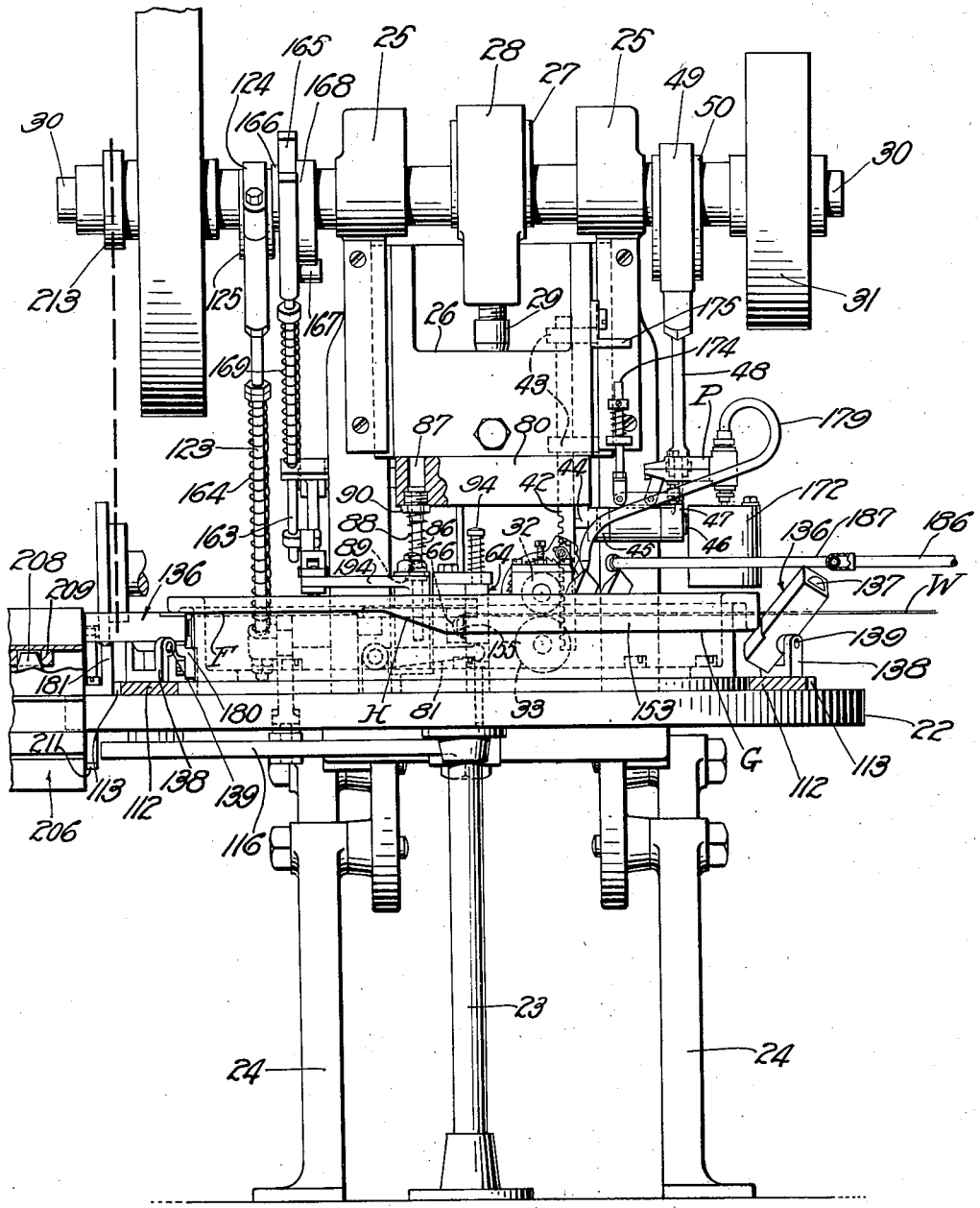

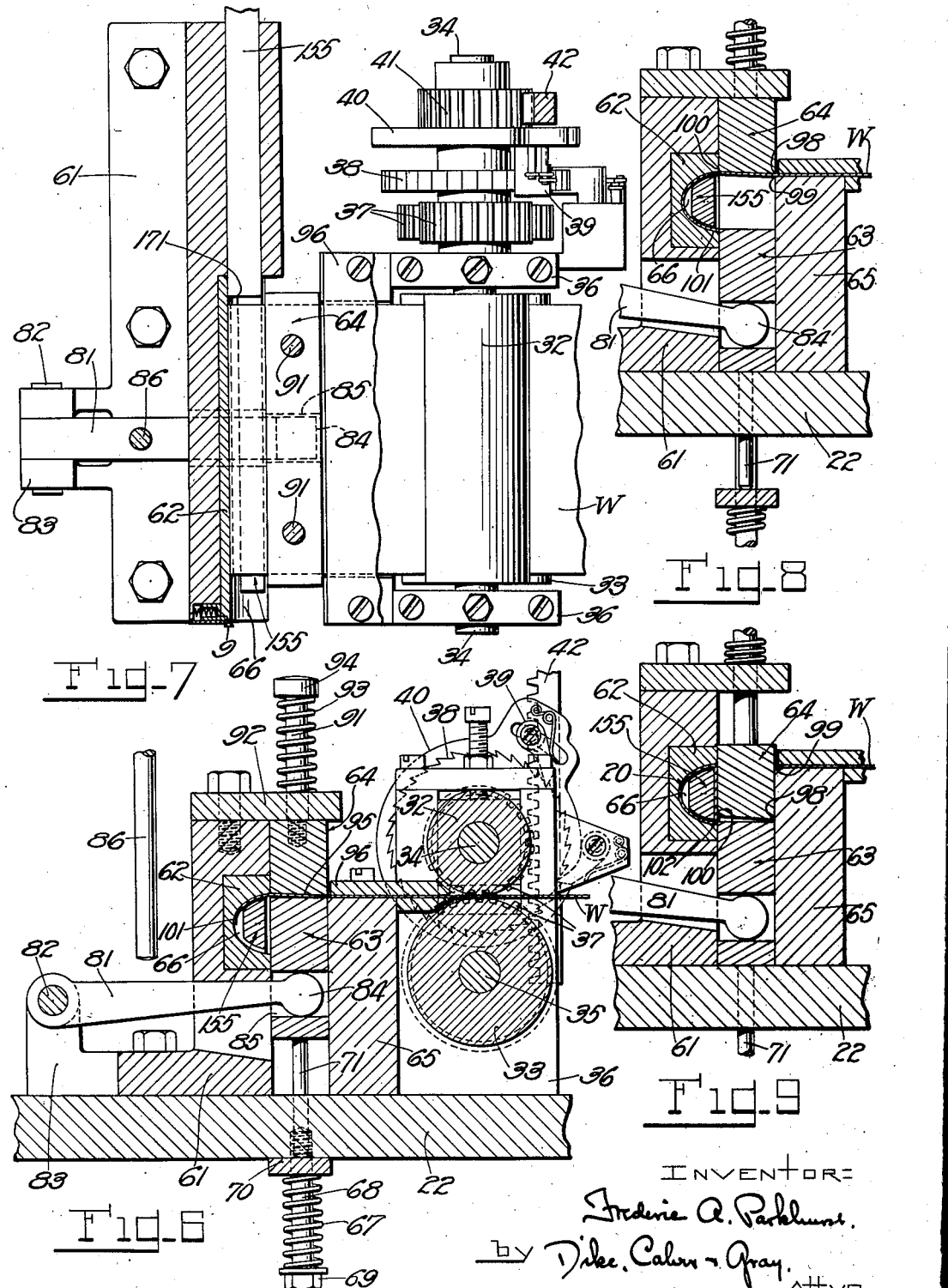

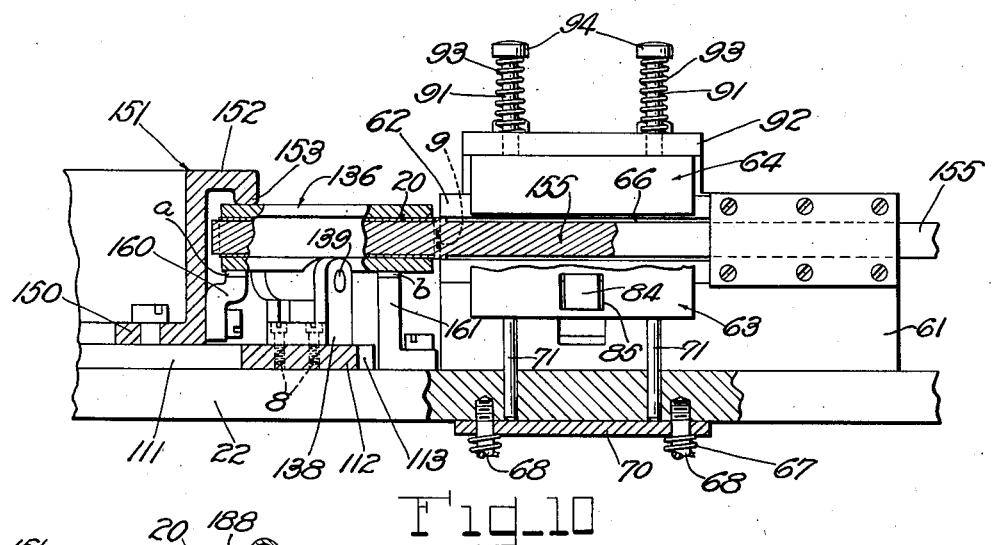
Fig. 10
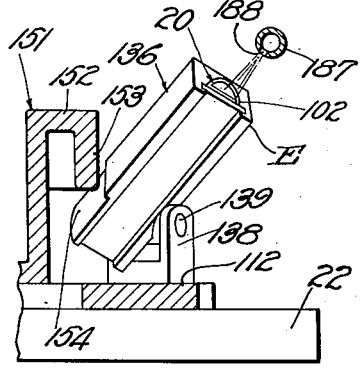
Fig. 12
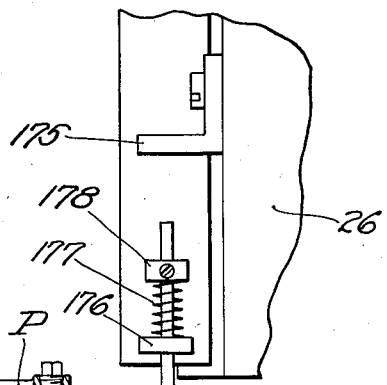
Fig. 11
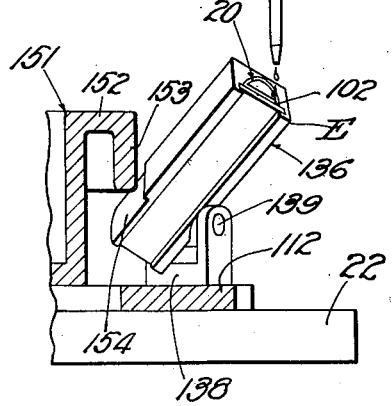
INVENTOR:
Frederic A. Parkhurst,
by Dike, Calver & Gray,
Attys.

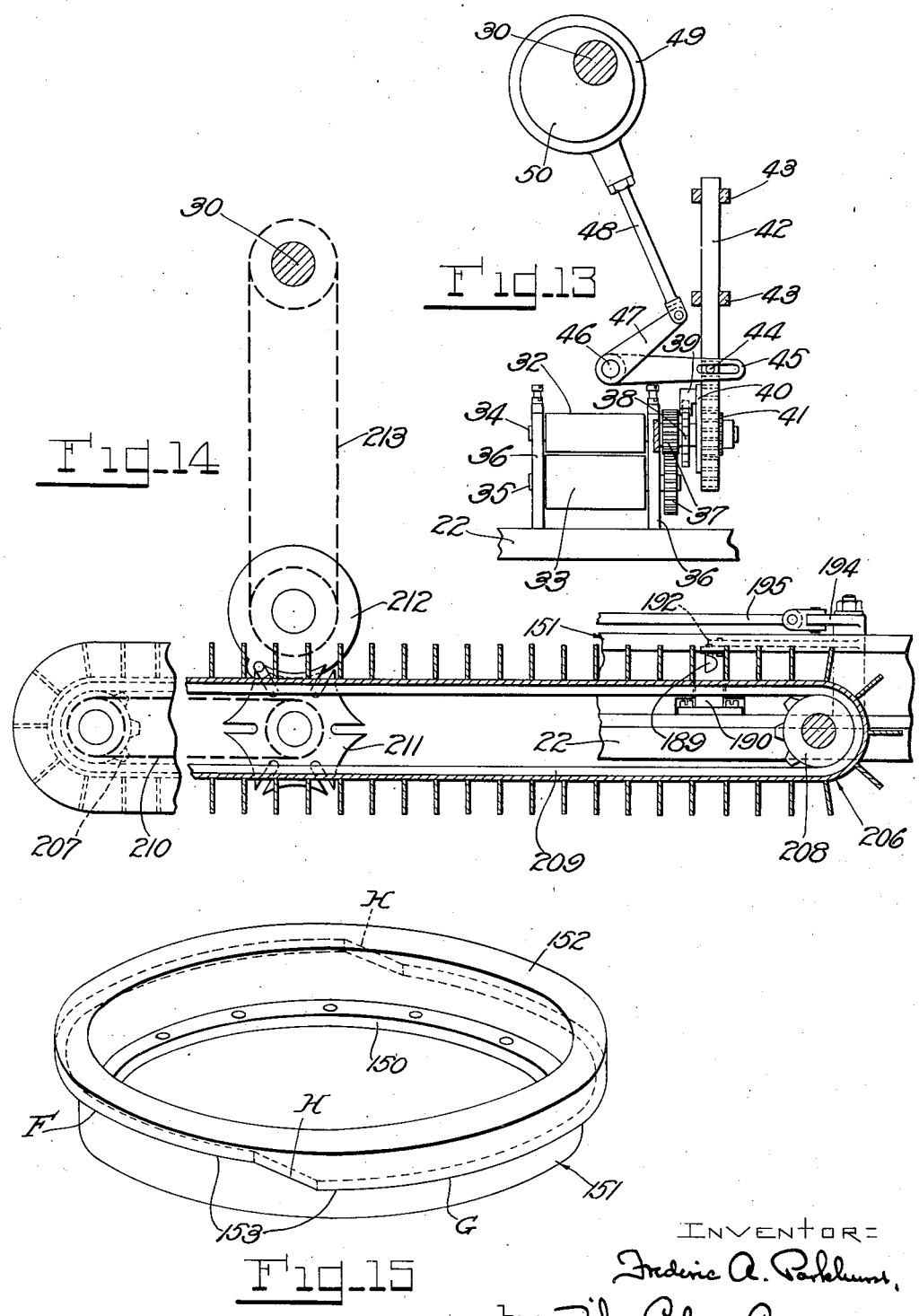

2,230,410

UNITED STATES PATENT OFFICE 2,230,410

METHOD AND APPARATUS FOR MAKING HOLLOW BODIES

Frederic A. Parkhurst, Suffield, Conn., assignor to Monsanto Chemical Company, St. Louis, Mo., a corporation of Delaware Application May 10, 1939, Serial No. 272,803

19 Claims. (Cl. 93—77)

This invention relates to the manufacture, from sheet material, of hollow bodies, especially, although not exclusively, to tubular containers for tooth brushes or similar articles, and has for its general object the provision of a method and an automatic apparatus whereby satisfactory containers of this character can be rapidly and economically produced in quantities.

The more particular objects of the invention will best be understood from the following description of the construction and operation of the apparatus shown in the accompanying drawings and by which said invention may be carried into effect, this particular apparatus having, however, been chosen for purposes of exemplification merely, it being obvious that said invention, as defined by the claims hereunto appended, may be otherwise embodied and practiced without departure from the spirit and scope thereof.

In said drawings:

Fig. 1 is a perspective view of the parts required to form a container, the main or body portion of which is produced by the machine herein shown.

Fig. 2 is a longitudinal vertical section of the machine.

Fig. 3 is a horizontal section taken substantially on the line 3—3, Fig. 2, certain of the parts being omitted to avoid repetition and thus simplify the view.

Fig. 4 is a perspective view of one of the matrices or holders for the partially completed container bodies.

Fig. 5 is a front elevation, partly broken away, of the machine, with certain of the parts again omitted.

Fig. 6 is an enlarged vertical section taken substantially on the line 6—6, Fig. 2.

Fig. 7 is a plan view of the parts shown in Fig. 6.

Figs. 8 and 9 are views similar to Fig. 6 but showing the parts in different positions.

Fig. 10 is a vertical section taken substantially on the line 10—10, Fig. 3.

Fig. 11 is a schematic view illustrating the application of the cementing liquid.

Fig. 12 illustrates the application of compressed air.

Fig. 13 is a fragmentary view of the driving mechanism for the feed rolls.

Fig. 14 is a sectional view of the conveyor which receives the completed container bodies, together with portions of the driving mechanism therefor.

Fig. 15 is a perspective view of the main cam for controlling the position of the matrices on the dial or rotating carrier.

The invention is herein illustrated in connection with a machine for forming the body portions of containers of the type shown in Fig. 1. As shown in said figure, a container of this type comprises a tubular body portion 20, which is the part produced by the machine hereinafter described, said body portion having open ends which are subsequently closed by heads 21 applied by means forming no portion of the present invention. As shown in Fig. 1, the body portion 20 is of semi-cylindrical form, that is to say, is of substantially semi-circular cross section, although it will be understood that the particular cross-sectional shape is subject to considerable modification according to the requirements.

Referring particularly to Figs. 2 and 5, the machine frame comprises a bed 22 carried by suitable supports 23 and 24 and from which rises a pair of uprights 25, together with certain other attached parts, the whole affording the necessary supports, guides, bearings, etc. for the various moving parts of the machine. The uprights 25 are formed with vertical guides for a ram 26 adapted to be reciprocated toward and from the bed by means of an eccentric 27 surrounded by an eccentric strap 28 connected with said ram by an adjustable pitman 29, said eccentric being secured to a shaft 30 journalled in the upper ends of the uprights 25 and having a belt pulley 31 through which power to rotate said shaft may be applied from any suitable source.

A web of sheet material W (Fig. 5) is supplied to the machine from a suitable source, said sheet material being of any character suitable for the formation of the container body. For the purposes of the present description it may be assumed to be a sheet of plastic material, such as cellulose acetate. The web W is intermittently fed into the machine between upper and lower feed rollers 32 and 33 (see also Figs. 6, 7 and 13) carried respectively by parallel shafts 34 and 35 journalled in uprights 36 rising from the bed 22, said shafts being connected for rotation in unison in opposite directions by gears 37 so proportioned as to cause said rollers 32 and 33 to travel at the same peripheral speed. Secured to the shaft 34 is a ratchet 38 engaged by a pawl 39 pivoted to a pawl carrier 40 mounted to oscillate on the shaft 34. Secured to or formed integral with the pawl carrier 40 is a pinion 41 which is engaged by a rack 42 guided for vertical movement in arms 43 extending from one of the uprights 25. The rack 42 carries a pin 44 which is engaged by the slotted arms 45 of a bell crank pivoted at 46 and the other arm 47 of which is connected by a pitman 48 with an eccentric strap 49 encircling an eccentric 50 on the shaft 30.

As the web W is intermittently advanced by the feed rolls 32, 33, its forward end is fed into forming mechanism most clearly shown in Figs. 6 to 9. Said mechanism comprises a die support 61 secured to and rising from the bed 22 and carrying a forming die 62, a gauge plate 63, a punch 64 constituting a combined cutter and former or bender, and a combined guide and cutter block 65. The die 62 is formed with a cavity 66 of the general form of the container body to be produced, having a curved concave inner surface corresponding to the curved portion of said body, but having an open side disposed in the direction from which the web W is advanced. The block 65 is supported by the bed 22 in parallel spaced relation to the die support 61. The gauge plate 63 is guided for vertical movement between the support 61 and block 65 and is normally held in the elevated position shown in Fig. 6, and in which it substantially covers the open side of the die cavity 66, by means of springs 67 (see also Fig. 2), encircling rods 68 depending from the bed 22, and interposed between heads 69 on said rods and a cross head 70 which is engaged by stems 71 depending from the gauge plate 63 and guided in suitable openings in the bed 22. The gauge plate 63 is periodically depressed, against the tension of the spring 67, from the position shown in Fig. 6 to the position shown in Fig. 8, to expose the open side of the die cavity, by an arm 81 pivoted at 82 between ears 83 on the bed 22 and having a rounded end 84 engaging an opening 85 in said gauge plate, said arm being periodically engaged, to so depress the gauge plate, by a plunger 86 depending from the head 80 of the ram 26, and having its upper end movable into an opening 87 in said head, said plunger being, however, normally held in the depressed position shown in Fig. 5 by a spring 88 encircling the same and interposed between a shoulder 89 thereon and a bushing 90 carried by the ram head and in which said plunger is guided.

The punch 64, which is located in alinement with the gauge plate 63 and is likewise guided between the support 61 and block 65, is supported by stems 91 (see also Fig. 2) guided for vertical movement in a cap plate 92, bolted or otherwise secured to the top of the support 61, and normally held in the elevated position shown in Fig. 6 by springs 93 interposed between said cap plate and heads 94 on said stems, but being adapted to be depressed, against the tension of said springs, from the position shown in Figs. 6 and 8 into the position substantially opposite the die cavity, as shown in Fig. 9, by engagement of the heads 94 by the head 80 of the ram 26 when the latter descends.

When the web W is advanced by the said rolls 32 and 33, the parts occupy the position shown in Fig. 6 with the upper edge of the gauge plate 63 flush with the upper edge of the block 65, and with the lower end of the punch 64 just above the mold cavity 66 and slightly elevated above the upper end of the gauge plate to leave a space 95 substantially in alinement with and tangential to the upper edge of the mold cavity and of a width substantially equal to the thickness of the web W. As the web is advanced over the top of the block 65, and between the latter and a guide plate 96 supported by the uprights 36, it passes through the space 95 into the mold cavity 66, and in the course of said advance is caused, by engagement of its forward end with the curved wall of said molding cavity, to be bent as indicated in Fig. 6 into the position shown in Fig. 8. The parts are so designed that the advance of the web by the feed rolls at each operation of the latter is just sufficient to bring the end of the web into substantially the position shown in the latter figure, that is to say, to cause the web to traverse the curved face of the die cavity 66 and bring its end 101 substantially into engagement with the gauge plate 63 which at this time is in the elevated position shown in Fig. 6. The advance of the web is then interrupted, and the arm 81 is engaged by the plunger 86 to depress the gauge plate 63 from the position shown in Fig. 6 into that shown in Fig. 8. Thereafter, the heads 94 of the rods 91 are engaged by the ram head 80, and the punch 64 depressed from the position shown in Fig. 8 into that shown in Fig. 9, the plunger 86 yielding during this operation. At its side adjacent the block 65 the punch 64 is formed with a cutting edge 98 which cooperates with a cutting edge 99 on said block, while at its opposite side adjacent the die 62 it is formed with a curved bending edge 100, being of slightly less length at the latter side than at the former, while the width of the said punch as well as that of the gauge plate is substantially equal to the width of the open side of the die cavity 66. Consequently, as the punch is depressed, it operates to shear the web between the cutting edges 98 and 99 to form a detached sheet and thereafter to bend the rear portion of said sheet, previously occupying the space 95, downwardly to cause the sheared edge to abut the original edge 101 of the sheet to form a butt joint 102.

Supported on the bed 22 (see particularly Figs. 2 and 3), and guided for rotation about a raised disk 111 secured to or formed integral with the latter, is a dial ring or annular carrier 112. Said dial ring is formed about its periphery with notches 113 to receive a pawl 114 pivotally carried by the head 115 of an oscillating arm 116 pivoted to a stud 117 projecting from the underside of the bed, the latter being cut away, as indicated at 118 in Fig. 3, to permit oscillation of said head. The arm 116 is connected by links 119 and 119′ with one arm 120 of a bell crank pivoted at 121 to one of the uprights 25, and the other arm 122 of which is connected by a link 123 with an eccentric strap 124 encircling an eccentric 125 on the shaft 30.

The arrangement is such that, as the arm 116 is oscillated, the dial ring 112 will be angularly advanced an amount corresponding to the spacing of successive notches 113 at each rotation of the shaft 30. Also cooperating with the notches 113 is a spring pressed holding pawl 131 guided on the bed 22 for movement radially of the ring and having connected thereto one arm of a lever 132 pivoted at 133 to said bed and carrying at its opposite end a roller 134 cooperating with a cam plate 135 on the head 115. The arrangement is such that, as the head 115 is moved in a counter-clockwise direction, as viewed in Fig. 3, the pawl 114 will be moved from one of the notches 113 into a position to engage the next adjacent notch, the pawl 131 this time holding the ring against movement, and as the head 115 approaches the limit of this retrograde movement, engagement of the cam 135 with the roller 134 will cause the pawl 131 to be released, subsequent movement of the head 115 in a clockwise direction causing the pawl 114 to advance the ring, the pawl 131 at this time riding upon the edge of the ring between adjacent notches and snapping into the next adjacent notch when the advancing movement is completed.

Carried by the dial ring 112 is a series of matrices or holders 136, the form of one of which is shown in detail in Fig. 4. Each of said holders is formed with a longitudinal cavity 137 whose cross section corresponds to that of the die cavity 66, and consequently to that of the container body 20 formed as above described. Each of the holders 136 is pivotally mounted on the ring 112 by means of a bifurcated bracket 138 (see also Fig. 10) secured to said ring by screws 8. Each of the brackets 138 carries a pivot pin 139 which is received in a hollow cylindrical boss 140 formed on the corresponding carrier 136. The disposition of the brackets 138 on the ring 139 and that of the bosses 140 on the carriers 136 are such that the pivot pins 139 are inclined both to the radius or circumference of the ring and to the longitudinal axes of the holders 136, the arrangement being such that, when the holders are in the horizontal positions indicated by A and B in Fig. 3, they will be disposed radially of the ring with the faces 141 (Fig. 4) of their cavities substantially vertical, but when tilted upon their pivots into the positions shown at C and D in Fig. 3, they will be twisted to bring one of their edges, indicated at E in Figs. 2, 3, 4, 11 and 12, into a position relatively lower than the others. For purposes of simplicity only a relatively few of the holders 136 are shown in Fig. 3, and also in certain other figures, but it will be understood that there is a continuous annular series of these holders corresponding in number and angular spacing to the notches 113.

Bolted or otherwise secured to the upper face of the disk 111 is the lower flange 150 of a stationary annular or cylindrical cam member 151 (see Figs. 2, 3 and 15) having at its upper edge an outstanding flange 152 terminating at its outer edge in a down-turned flange 153 which, through about one-half of its circumference, is relatively short, as shown in Fig. 10 and indicated at F in Figs. 3, 5, and 15, and through the remainder of its circumference is relatively long or deep, as shown in Figs. 11 and 12 and indicated at G in Figs. 3, 5 and 15, the short and deep portions being connected by inclined portions H as shown in Figs. 5 and 15. The holders 136 are formed with surfaces 154 (Figs. 4, 11 and 12) to engage the lower edge of the depending flange 153, and when opposite the short portion F of the latter said holders are moved into the horizontal radial position shown in Fig. 10 and at A and B in Fig. 3, but when brought into engagement with the deep portion G thereof will be turned into the inclined and twisted position shown in Figs. 11 and 12 and at C and D in Fig. 3. Means are provided to move the holders into horizontal position and to ensure registration of each matrix cavity 137 with the die cavity 66 when each matrix or holder 136 reaches the position indicated in Fig. 10 and at A in Fig. 3. As shown most clearly in Fig. 10 said means comprises a fixed element 160 the curved upper extremity $a$ of which moves the inner end of each matrix in a direction to bring the outer end thereof down into alinement with said die cavity, the curved upper extremity $b$ of a stop 161, in conjunction with the low portion F of the cam 151, serving to limit said downward movement. Referring to Figs. 2, 3, 6, 8, 9 and 10, there is located within the forming cavity 66 of the die 62 a mandrel 155 which assists in the shaping of the sheet material in said cavity as above described, and which is guided for longitudinal movement in the support 61, said mandrel being connected by a link 156 with an arm 157 carried by a shaft 158 journalled in bearings in the uprights 25. The shaft 158 also carries a bell crank 200, the arm 162 of which is pivotally connected with one end of a forked member 163 slidable in a bracket 164 attached to one of the uprights 25. The forked end 165 of said member 163 embraces an enlarged portion 166 on the shaft 30, and is provided with a roller 167 (Figs. 2 and 5) which is adapted to engage an edge cam 168 carried by said shaft. A spring 169 interposed between the bracket 164 and a collar 170 adjustably secured to the forked member 163 keeps the cam roller 167 in engagement with said cam.

The mandrel 155 is formed with an ejecting shoulder 171 which, during the forming operation, occupies the position shown in Fig. 7. After the completion of the forming operation, as shown in Fig. 9, the mandrel 155 is moved by the mechanism above described toward the left as shown in Figs. 2 and 3, or downwardly as shown in Fig. 7, whereupon the shoulder 171 engages the end of the formed container body and ejects the same from the mold cavity 66. As each of the holders 136 reaches what may be considered the receiving position, indicated at A in Fig. 3, the cavity 137 therein is brought into alinement with the mold cavity 66, as previously described, and as the container body is ejected from the latter it is moved into the former in such a position that the butt joint 102 thereof is adjacent the edge E of a holder. It will, therefore, be seen that when each holder is moved into the tilted or twisted position shown in Fig. 11, and indicated at C in Fig. 3, the container body will be supported in an inclined position with said butt joint lowermost.

A stripper 9 (see particularly Figs. 7 and 10) mounted in the die support 61 in a manner to yield transversely of the line of travel of the mandrel 155 as the container body is moved out of the forming die into the holder, is adapted to prevent retraction of the body from the holder when said mandrel is withdrawn.

At a suitable station, indicated at J in Fig. 3, during the travel of each holder or matrix in inclined and twisted position from the position C, means are provided for applying a cementing liquid to the joint 102 to unite the abutting edges of the formed sheet into a substantially integral structure. Said liquid may comprise a liquid cement, but where a plastic material, such as cellulose acetate is used, a suitable solvent for such material, such as acetone, is preferably employed.

The mechanism for supplying the cementing liquid at the station J is illustrated in Fig. 11 and comprises a reservoir 172 for the cement or solvent from which the latter is drawn by a suitable pump P periodically operated through a lever 173 by a push rod 174 actuated by a lug 175 secured to and moving downwardly with the ram 26 (see also Fig. 5). The push rod 174 is slidably mounted in a projection 176 from one of the uprights 25 and is held in its uppermost or normal position (Fig. 11) by a spring 177 interposed between the projection 176 and a collar 178 adjustably secured to said push rod. The cement or solvent is discharged through a tube 179 upon the upper end of the joint 102, whence it flows by gravity downwardly along said joint to the lower end thereof.

In order to dry the cement, or evaporate the solvent, applied as above described, the container body in each holder, as the latter travels from the station J to the position D, is subjected to a blast of air or other suitable gaseous medium supplied from a suitable source (not shown) through a pipe 186, Fig. 3, to an arcuate tube 187 arranged concentric with the ring 112 and adjacent to the upper and outer ends of the containers 136 as they are moved therealong, said tube being provided with a series of perforations 188 (Fig. 12) arranged to direct such a blast into the cavities 137 of the holders 136 as they are moved successively past the several perforations.

As each holder 136 reaches the discharging position, indicated at B in Fig. 3, the completed container body is ejected therefrom by mechanism shown in Figs. 2 and 3. Said mechanism comprises a plunger 189 guided in a bracket 190 bolted or otherwise secured to and rising from the disk 111, said plunger being so arranged that, as each holder 136 is brought into the position B, the cavity 137 will be brought into alinement with said plunger, which is of a shape complementary to that of said cavity. To ensure coaxial alinement of the completed container body with the plunger 189, means, similar to that described to produce registration of the cavity 137 of each matrix 136 with the die cavity 66, is employed. Such means comprises elements 180 and 181 corresponding to the elements 160 and 161 respectively. The plunger 189 is connected by a link 191 with one arm 192 of a bell crank mounted to oscillate on a post 193 rising from said disk 111, the other arm 194 of said bell crank being connected by a link 195 with the arm 196 of the bell crank 200 previously described.

The container bodies 20, as successively ejected from the holders 136 as above described, are received in compartments in an endless travelling conveyor 206 (Figs. 3, 5, and 14) whence they are carried to a suitable point of delivery. The conveyor 206 is intermittently driven, in synchronism with the operation of the ejecting mechanism above described, to bring the several compartments therein into position to receive the successively ejected container bodies, by means of sprockets 207 and 208 connected for rotation in unison by a chain 209, and the former of which is connected by a chain 210 with a star wheel 211 constituting one element of a Geneva stop mechanism, the other element 212 of which is continuously rotated through chain and sprocket gearing 213 from the shaft 30.

I claim:

1. The method of making hollow bodies from sheet material which includes bending a sheet of said material upon itself to bring its opposite edges into abutting relation and thereby form an open ended tubular body, holding said sheet in such condition while supporting said body in inclined position with the joint between said abutting edges lowermost, and directing a cementing liquid into the upper end of said body upon the upper end of said joint and permitting the same to flow downwardly therealong.

2. The method of making hollow bodies from sheet material which includes bending a sheet of said material upon itself to bring its opposite edges into abutting relation and thereby form an open ended tubular body, holding said sheet in such condition while supporting said body in inclined position with the joint between said abutting edges lowermost, directing a cementing liquid into the upper end of said body upon the upper end of said joint and permitting the same to flow downwardly therealong, and thereafter directing a stream of gaseous fluid into said end and upon said joint.

3. The method of making tubular bodies which includes advancing one edge of a sheet of material against a curved concave surface and thereby causing said edge to follow said surface and bend a portion of said sheet into a correspondingly curved form, and thereafter bending another portion of said sheet to bring the opposite edge of said sheet into abutting relation with said first-named edge.

4. The method of making tubular bodies which includes advancing one edge of a sheet of material against a curved concave surface and thereby causing said edge to follow said surface and bend a portion of said sheet into a correspondingly curved form, bending another portion of said sheet to bring the opposite edge of said sheet into abutting relation with said first-named edge and thereby form an open ended tubular body, supporting said body in inclined position with the joint between said abutting edges lowermost, and directing a cementing liquid into the upper end of said body upon the upper end of said joint and permitting the same to flow downwardly therealong.

5. The method of making tubular bodies which includes advancing an end edge of a web of sheet material against a curved concave surface and thereby causing said edge to follow said surface and bend the adjacent portion of said web into a correspondingly curved form, and thereafter cutting said web transversely and bending the severed edge of the detached portion into abutting relation to said first-named edge.

6. In a machine for forming tubular bodies from sheet material, in combination, a die having a cavity therein of the cross sectional shape of the body to be formed and provided with an open side and a curved concave inner surface, means for advancing a sheet of said material into said cavity in a direction substantially tangential to said surface, and means for bending the rear portion of said sheet across the open side of said cavity.

7. In a machine for forming tubular bodies from sheet material, in combination, a die having a cavity therein of the cross sectional shape of the body to be formed and provided with an open side and a curved concave inner surface, means for advancing the forward end of a web of said material into said cavity in a direction substantially tangential to said surface, and means for severing said web and bending the detached portion thereof across the open side of said cavity.

8. In a machine for forming tubular bodies from sheet material, in combination, a die having a cavity with an open side and a curved concave inner surface, a gauge plate movable between a position to substantially cover the open side of said cavity and a position to expose the same, a bending member alined with said gauge plate and movable between a position above said cavity to a position below the same, means for advancing a sheet of material between said gauge plate and bending member into said cavity in a direction substantially tangential to the surface thereof, and mechanism for moving said gauge plate and bending member from their first named to their second named positions to cause said bending member to bend the rear portion of said sheet across the open side of said cavity.

9. In a machine for forming tubular bodies from sheet material, in combination, a die having a cavity with an open side and a curved concave inner surface, a gauge plate movable between a position to substantially cover the open side of said cavity and a position to expose the same, a combined cutting and bending member alined with said gauge plate and movable between a position above said cavity to a position opposite the same, means for advancing the forward end of a web of material between said gauge plate and bending member into said cavity in a direction substantially tangential to the surface thereof, and mechanism for moving said gauge plate and member from their first named to their second named positions to cause said bending member to sever said web and bend the detached portion thereof across the open side of said cavity.

10. In a machine for making tubular bodies from sheet material, in combination, mechanism for bending a sheet of said material into tubular form with opposite edges abutting, said mechanism including a die having a cavity therein of the cross sectional shape of the body to be formed, a matrix having a cavity corresponding in shape to said die cavity and in which the bent sheet is held until said abutting edges are united, and means for transferring the bent sheet from the die cavity to the matrix cavity.

11. In a machine for making tubular bodies from sheet material, in combination, mechanism for bending a sheet of said material into tubular form with opposite edges abutting, said mechanism including a die having a cavity therein of the cross sectional shape of the body to be formed, a series of matrices each having a cavity corresponding in shape to said die cavity and in which the bent sheet is held until said abutting edges are united, means for moving said matrices to bring them successively into register with said die, and means for transferring the successively bent sheets from the die cavity to the cavities of successive matrices.

12. In a machine for making tubular bodies from sheet material, in combination, mechanism for bending a sheet of said material into tubular form with opposite edges abutting, said mechanism including a die having a cavity therein of the cross sectional shape of the body to be formed, a series of matrices each having a cavity corresponding in shape to said die cavity and in which the bent sheet is held until said abutting edges are united, means for moving said matrices to bring them successively into register with said die, means for transferring the successively bent sheets from the die cavity to the cavities of successive matrices, and means for successively ejecting the completed bodies from said matrices.

13. In a machine for making tubular bodies from sheet material, in combination, mechanism for bending a sheet of material to bring its opposite edges into abutting relation and supporting the body so formed in inclined position with the joint formed by the abutting edges lowermost, and means for supplying a cementing liquid to the upper end of said joint.

14. In a machine for making tubular bodies from sheet material, in combination, mechanism for bending a sheet of material to bring its opposite edges into abutting relation and supporting the body so formed in inclined position with the joint formed by the abutting edges lowermost, means for supplying a cementing liquid to the upper end of said joint, and means for thereafter directing a blast of air into said body to dry said liquid.

15. In a machine for making tubular bodies from sheet material, in combination, means for bending a sheet of material to bring its opposite edges into abutting relation and thereby form such a body, a matrix having a cavity corresponding in shape to said body, means for inserting said body into said cavity, means for so positioning said matrix that said body is inclined with the joint formed by said abutting edges lowermost, and means for supplying a cementing liquid to the upper end of said joint.

16. In a machine for making tubular bodies from sheet material, in combination, mechanism for bending a sheet of said material into tubular form with opposite edges abutting, said mechanism including a die having a cavity therein of the cross sectional shape of the body to be formed, a matrix having a cavity corresponding in shape to said die cavity and in which the bent sheet is held until said abutting edges are united, means for transferring the bent sheet from the die cavity to the matrix cavity, means for turning said matrix into such position that the body therein is inclined with the joint formed by said abutting edges lowermost, and means for supplying a cementing liquid to the upper end of said joint.

17. In a machine for making tubular bodies from sheet material, in combination, means for bending a sheet of said material to bring opposite edges into abutting relation and thereby form such a body, a series of matrices having cavities to receive the bodies so formed, means for moving said matrices to bring them successively into position to receive said bodies from said bending means, means for turning said matrices, as they are moved out of said position, into an inclined position, and means for discharging a cementing liquid into the upper ends of said bodies and upon the abutting edges of said sheet while said matrices are in the latter position.

18. In a machine for making tubular bodies from sheet material, in combination, means for bending a sheet of said material to bring opposite edges into abutting relation and thereby form such a body, a series of matrices having cavities to receive the bodies so formed, means for moving said matrices to bring them successively into position to receive said bodies from said bending means, means for turning said matrices, as they are moved out of said position, into an inclined position, means for discharging a cementing liquid into the upper ends of said bodies and upon the abutting edges of said sheet while said matrices are in the latter position, and means for subsequently ejecting the finished bodies successively from said matrices.

19. In a machine for making tubular bodies from sheet material, in combination, means for bending a sheet of said material to bring opposite edges into abutting relation and thereby form such a body, a series of matrices having cavities to receive the bodies so formed, means for transferring said bodies from said bending means to said matrices, means for ejecting said bodies from said matrices, a rotary carrier upon which said matrices are pivotally mounted, means for intermittently rotating said carrier to move said matrices successively into position to receive bodies from said transferring means and thereafter successively into position to have said bodies ejected by said ejecting means, a cam ring engaged by said matrices and having a portion adapted, as said matrices are moved from receiving to ejecting position, to turn the same upon their pivots into an inclined position, and means for discharging a cementing liquid into the upper ends of said bodies and upon the abutting edges of said sheet while said matrices are in said inclined position.

FREDERIC A. PARKHURST.